(12) United States Patent
Harris et al.

(10) Patent No.: US 6,795,937 B2
(45) Date of Patent: Sep. 21, 2004

(54) MULTIPLE TRAPS AFTER FAULTY ACCESS TO A RESOURCE

(75) Inventors: Jeremy Graham Harris, Chalfont St. Giles (GB); Paul Durrant, Farnham Royal (GB)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 09/783,119

(22) Filed: Feb. 13, 2001

(65) Prior Publication Data

US 2002/0040450 A1 Apr. 4, 2002

(30) Foreign Application Priority Data

Oct. 3, 2000 (GB) .............................................. 0024192

(51) Int. Cl.⁷ .............................................. G06F 11/00
(52) U.S. Cl. ......................................... 714/42; 714/48
(58) Field of Search .......................... 714/3, 5, 39, 42, 714/43, 47, 48; 711/202, 203; 718/104

(56) References Cited

U.S. PATENT DOCUMENTS

| | | | | |
|---|---|---|---|---|
| 4,188,670 A | * | 2/1980 | Hsia ............................ 365/49 |
| 4,719,626 A | * | 1/1988 | Ogasawara .................. 714/33 |
| 4,972,345 A | * | 11/1990 | Munier et al. ................ 714/48 |
| 5,450,573 A | | 9/1995 | Gronemeyer |
| 5,455,834 A | * | 10/1995 | Chang et al. ............... 714/768 |
| 5,493,660 A | | 2/1996 | DeLano et al. |
| 5,627,965 A | * | 5/1997 | Liddell et al. ................ 714/48 |
| 5,819,027 A | * | 10/1998 | Budelman et al. ............ 714/47 |
| 5,881,282 A | * | 3/1999 | Shipman ........................ 713/2 |
| 6,067,634 A | * | 5/2000 | Nelson ........................... 714/4 |
| 6,145,055 A | * | 11/2000 | Fujimoto ..................... 711/128 |
| 6,253,317 B1 | | 6/2001 | Knapp, III et al. |
| 6,353,898 B1 | * | 3/2002 | Wipfel et al. ................. 714/48 |
| 6,560,724 B1 | * | 5/2003 | Ganske ......................... 714/43 |

FOREIGN PATENT DOCUMENTS

| | | |
|---|---|---|
| EP | 0 380 093 | 1/1989 |
| WO | 00/60462 | 10/2000 |

OTHER PUBLICATIONS

Combined Search and Examination Report for Application No. GB 0024192.7 dated Sep. 21, 2001.

* cited by examiner

Primary Examiner—Nadeem Iqbal
Assistant Examiner—Tim Bonura
(74) Attorney, Agent, or Firm—Robert C. Kowert; Meyertons, Hood, Kivlin, Kowert & Goetzel, P.C.

(57) ABSTRACT

To provide efficient resource access control in a computer system, a trap handler for handling a trap in the event of a faulty resource access being detected is arranged to define a diversion for subsequent access attempts to the same resource. An address translation mechanism is responsive to indication of a diversion for a resource access to modify an address mapping, whereby subsequent attempts to access the resource are diverted in accordance with the diversion. The trap handler can be arranged in a conventional manner to process an exception of the first faulty access to the resource. However, by defining the diversion, which can be used to map further attempts to access the same resource, unnecessary exception processing can be avoided.

28 Claims, 7 Drawing Sheets

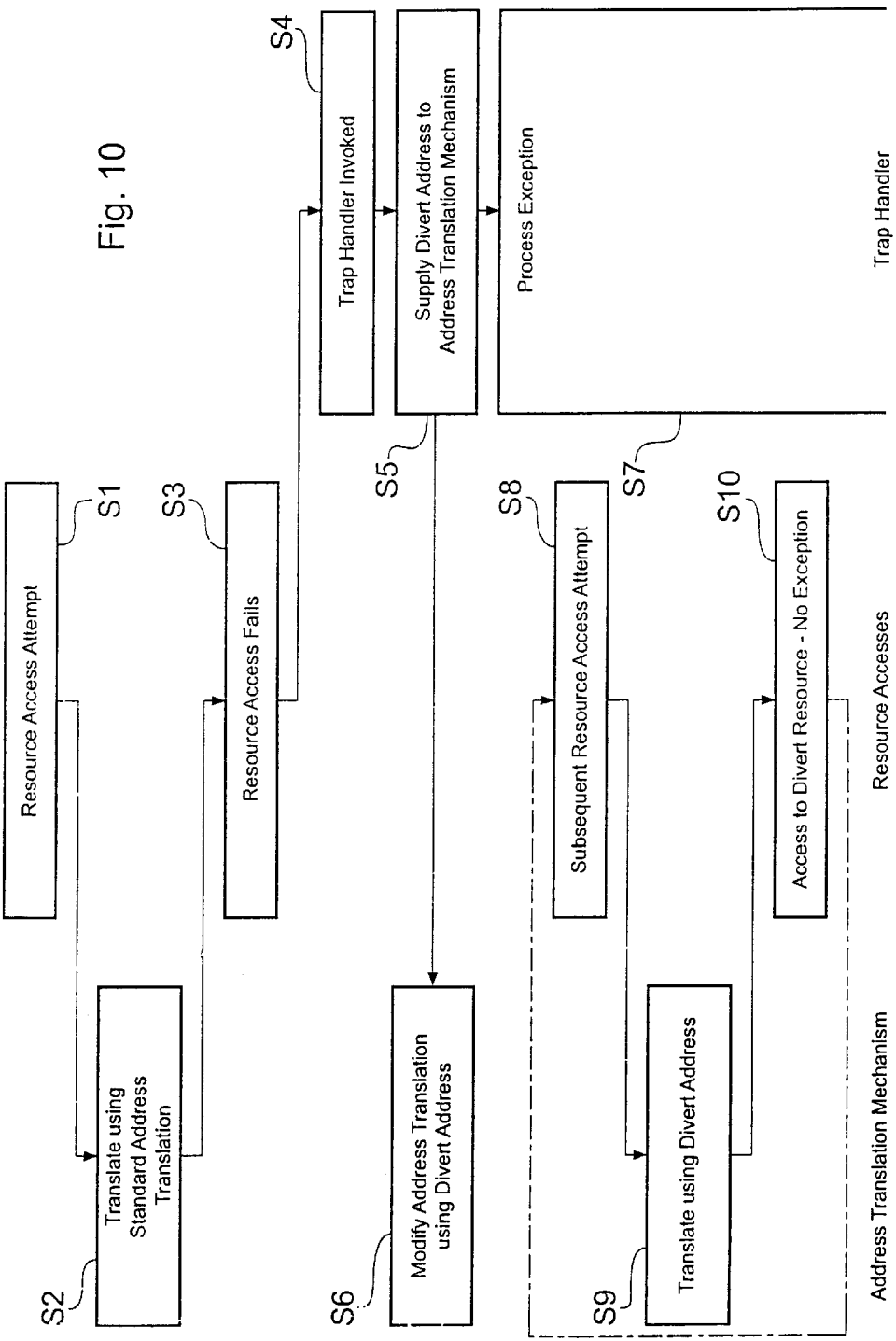

MULTIPLE TRAPS AFTER FAULTY ACCESS TO A RESOURCE

BACKGROUND OF THE INVENTION

The invention relates to the control of access to system resources in a computer system.

A problem that the present invention addresses is the control of access to resources in a computer system in the event of an error related to the resource to be accessed. The resource can be, for example, a memory location or a block of memory, a memory device, a peripheral device, etc. The error can be as a result of a failure of the resource itself, or a failure along the communication path from the processor to the resource or faulty programming of an application program or of an operating system. In the event of an error, a trap can be taken by the processor to process the fault. Where multiple accesses are attempted to the same resource, multiple traps will be taken. The result of this is that an increasing amount of processor time can be absorbed in processing the fault.

U.S. Pat. No. 5,627,965 describes a fault tolerant computer system including a central processor sub-system and a plurality of other subsystems, the subsystems being connected via a main data transfer bus. The central processor subsystem comprises three central processor modules. Each central processor module (or CPUset) includes a central processing unit (CPU) connected to a private bus, a first bus interface connecting the private bus to a shared bus, and a second bus interface connecting the shared bus to the main bus. The CPUsets are connected over respective private buses to a shared bus. Connected to the shared bus is a slot response memory. The slot response memory includes locations corresponding to respective slots for subsystems on the main bus. According to column 15 of U.S. Pat. No. 5,627,965, where a subsystem in a slot is functioning correctly, a location in the slot response memory corresponding to that slot will contain '0' data and the slot response register will not interfere with data transfers on the main bus. Where the subsystem in a slot becomes defective or absent from the system, then the location in the slot response memory corresponding to that slot is set to '1' and all subsequent attempts to access the defective or absent subsystem will result in artificial termination of the data transfer attempt.

PCT application PCT/US99/12605 is directed to a bridge for a fault tolerant computer system, which bridge connects I/O buses of first and second processing sets to a common I/O device bus. A resource control mechanism in the bridge provides an interface for exchanging signals with one or more resource slots of the device bus, each of the resource slots being capable of communicating with a system resource. The resource control mechanism in the bridge also includes a register associated with each system resource, the register having switchable indicia that indicate an operating state of the associated system resource. The control mechanism is operable in use to direct signals to and/or from respective system resources of the computer system.

The prior arrangements for resource access control as described above have required the provision of a specific system configuration to achieve this, and particularly in the context of a fault tolerant computing system. As a result, such resource access control arrangements are not generally applicable to more conventional computer systems.

An aim of the present invention is to provide an improved approach to resource access control that is applicable to many types of computer systems.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In one aspect, the invention provides a resource access control mechanism for a computer system including at least one central processing unit. The resource access control mechanism includes an address translation mechanism for mapping a received address to a resource. A trap handler handles a trap in the event of a faulty resource access being detected. The trap handler is operable to instigate a diversion for subsequent access attempts to the resource. The address translation mechanism is responsive to instigation of a diversion by the trap handler to effect the diversion for subsequent attempts to access the resource.

In an embodiment of the invention, therefore, a trap handler, which can be arranged in a conventional manner to process an exception in the event of a first faulty access to a resource, can instigate a diversion in an address translation mechanism. In this manner, subsequent access attempts to the same resource will result in the access attempt being diverted to a valid (but different) resource. As the system will already be treating the resource as faulty, the fact that the access attempt goes to a resource other than that intended will not cause any further problems, but it will mean that the processor does not have to process another exception for a faulty resource access.

The diversion can be instigated by the trap handler identifying an alternative resource address to the address translation mechanism. The diversion can then be effected by the address translation mechanism replacing a resource address held in an address translation entry for the resource with the alternative resource address.

Alternatively, the trap handler can instigate the diversion by simply signaling the address translation mechanism to effect the diversion.

The address translation mechanism can then react in various ways.

For example, the address translation mechanism can be arranged to replace the usual address translation with an alternative one from some predefined register or memory address.

Alternatively, the address translation mechanism can be arranged to set a divert flag in a translation entry of the address translation. The address translation mechanism can then be arranged to respond to a received address relating to an address translation entry having a divert flag that is set to use an alternative address to that held in the address translation entry (e.g., in some register or memory address). As a further alternative, the address translation mechanism can be arranged to respond to a received address relating to an address translation entry having a divert flag that is set to modify an address held in the address translation entry.

If desired, the diversion can be arranged to direct subsequent accesses to a fake response generator operable to generate a faked response to the resource access.

Alternatively, the diversion could point to a predefined memory portion (either directly or indirectly) whereby a response can be provided from a conventional memory controller.

The address translation mechanism can include a translation look-aside buffer, and can form part of a memory management unit. The resource concerned could be one or more of at least one memory location, a peripheral device, or a subsystem.

Another aspect of the invention provides a computer system comprising at least one processor that includes at least one central processing unit, memory, at least one peripheral device and a resource access control mechanism as set out above.

The computer system can be operable to identify an initial faulty access to a resource. It can be further operable in response to the initial indication of a faulty resource access to cause the resource access controller to set a fake response indication for a corresponding translation entry for said faulty resource access.

A further aspect of the invention provides a method of managing processor access to resources in a computer system. The method includes:

handling a trap in the event of an initial faulty access attempt to a resource being detected;

defining a diversion for subsequent access attempts to the same resource; and diverting subsequent access attempts to the resource diversion.

The invention also provides a computer program forming a trap handler for a computer system as set out above. The computer program comprises computer code operable to respond to faulty resource access by processing an exception and instigating a diversion in an address translation mechanism for subsequent access attempts to the resource.

The computer program can be in the form of program code carried by a carrier medium. The carrier medium could be a storage medium or a transmission medium, for example.

An embodiment of the invention can find applicability to computing systems including one or more processors, whether the computing systems are designed specifically to be fault tolerant or whether the computing systems are designed for more general use.

DESCRIPTION OF THE PREFERRED EMBODIMENTS

Exemplary embodiments of the present invention will be described hereinafter, by way of example only, with reference to the accompanying drawings in which like reference signs relate to like elements and in which:

FIG. 10 is a flow diagram illustrating the operation of a schematic block diagram of an exemplary embodiment of the invention.

DESCRIPTION OF PARTICULAR EMBODIMENTS

Exemplary embodiments of the present invention are described in the following with reference to the accompanying drawings.

Figure 1:
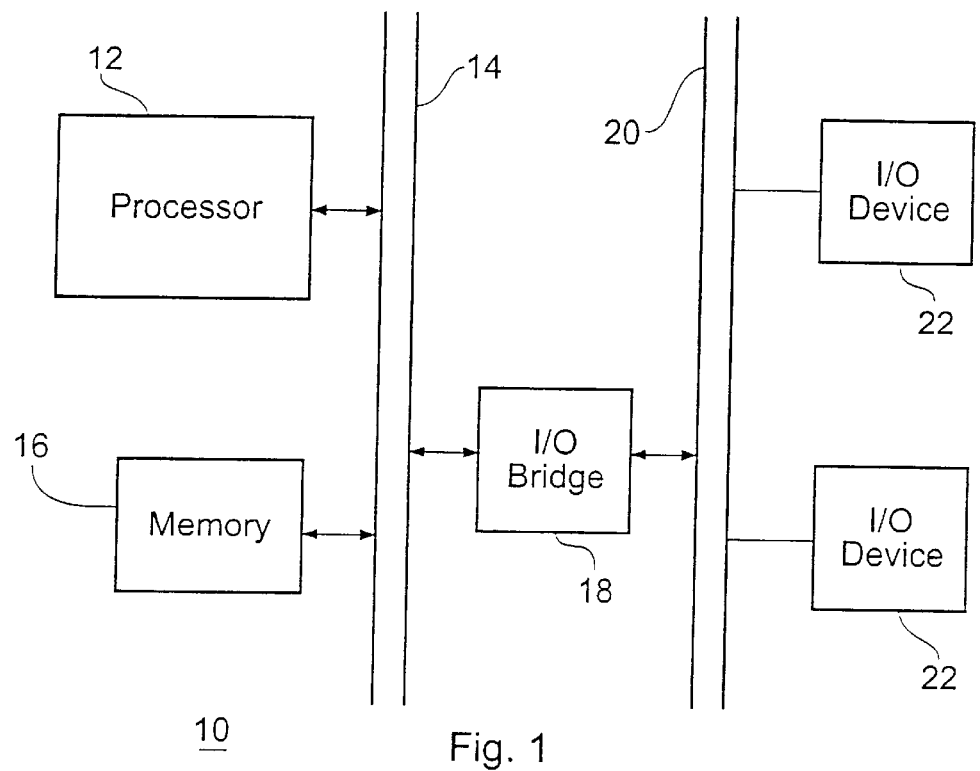
FIG. 1 is a schematic overview of a computer system.

FIG. 1 is an overview of a computer system 10 that includes a processor 12, a processor bus 14 to which are attached a plurality of subsystems including memory 16 and an I/O bridge 18. The processor 12 can typically be integrated in a single integrated circuit. The I/O bridge 18 provides an interface between the processor bus 14 and an I/O bus 20 to which a plurality of I/O devices 22 can be connected.

Figure 2:
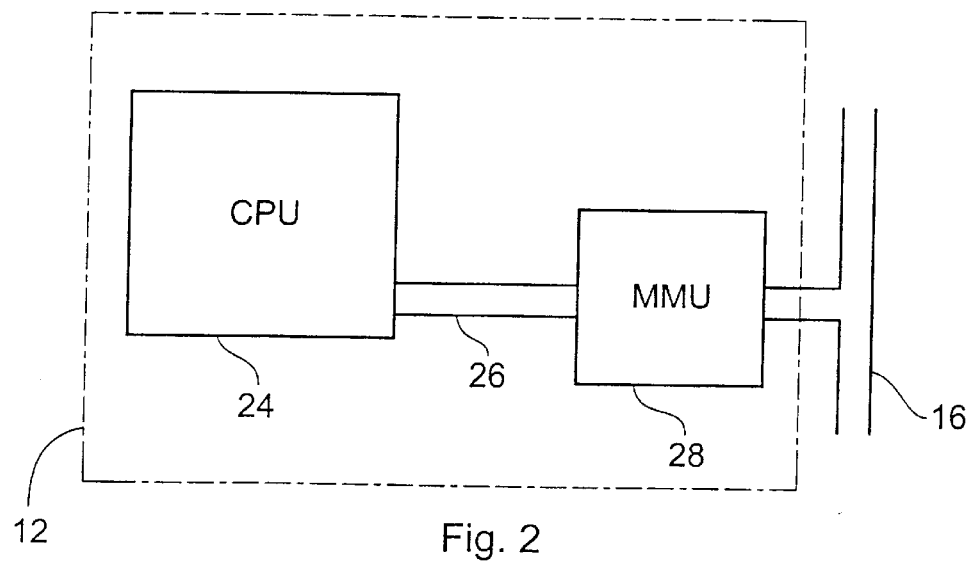
FIG. 2 is a schematic overview of a processor of the computer system of FIG. 1.

FIG. 2 is a schematic overview of a processor such as the processor 12 of FIG. 1. This includes a central processing unit (CPU) 24 connected via an internal bus 26 to a memory management unit (MMU) 28. The CPU 24 is operable to output virtual addresses on the internal bus 26 that are then converted by the MMU 28 into physical addresses for accessing system resources including the memory 16 and the I/O devices 22.

Figure 3:
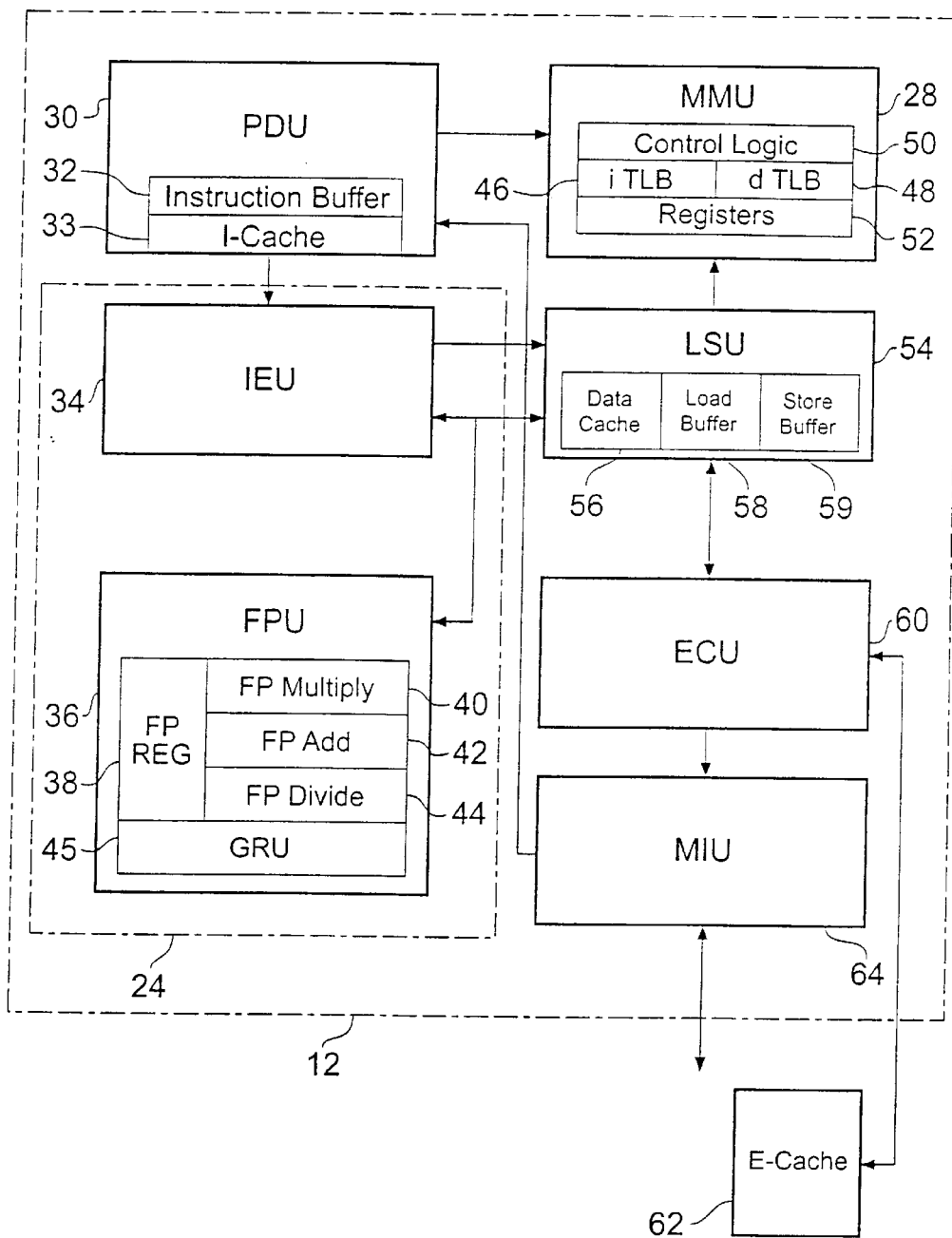
FIG. 3 is a schematic block diagram of a known type of processor.

FIG. 3 is a schematic block diagram of one type of processor 12, namely an UltraSPARC™ processor marketed by Sun Microsystems, Inc. Further details of the UltraSPARC™ processor can be found, for example, in the UltraSPARC™ I&II User's Manual, January 1997, available from Sun Microsystems, Inc, the content of which is incorporated herein by reference. The present invention can be implemented in a processor having the general overall structure of FIG. 3, although it should be appreciated that the invention could equally be implemented in processors having other structures.

In order to explain the present invention, there follows a description of the processor shown in FIG. 3.

The UltraSPARC™ processor is a high-performance, highly integrated superscalar processor implementing a 64-bit architecture. The processor pipeline is able to execute up to four instructions in parallel.

A Prefetch and Dispatch Unit (PDU) 30 fetches instructions before they are actually needed in the pipeline, so the execution units do not starve for instructions. Prefetched instructions are stored in the Instruction Buffer 32 until they are sent to the rest of the pipeline. An instruction cache (I-cache) 33 is a 16 Kbyte two-way set associative cache with 32 byte blocks.

An Integer Execution Unit (IEU) 34 includes two arithmetic logic units (ALUs), a multi-cycle integer multiplier, a multi-cycle integer divider, eight register windows, four sets of global registers (normal, alternate, MMU, and interrupt globals) and trap registers.

A Floating-Point Unit (FPU) 36 is partitioned into separate execution units, which allow two floating-point instructions to be issued and executed per cycle. Source and result data are stored in a 32-entry Floating Point (FP) register file (FP Reg) 38. FP multiply 40, FP Add 42 and FP Divide 44, are all catered for. A Graphics Unit (GRU) 45 provides a comprehensive set of graphics instructions.

The Memory Management Unit (MMU) 28 provides mapping between a 44-bit virtual address and a 41-bit physical address. This is accomplished through a 64-entry instructions translation look-aside buffer (iTLB) 46 for instructions and a 64-entry data translation look-aside buffer (dTLB) 48 for data under the control of MMU control logic 50. Both TLBs are fully associative. The control logic 50 also provides hardware support for a software-based TLB miss strategy. A separate set of global registers 52 is available to process MMU traps.

A Load/Store Unit (LSU) 54 is responsible for generating the virtual address of all loads and stores for accessing a data cache (D-Cache) 56, for decoupling load misses from the pipeline through a load buffer 58, and for decoupling stores through a store buffer 59.

An External Cache Unit (ECU) 60 handles I-Cache 33 and D-Cache 56 misses efficiently. The ECU 60 can handle one access per cycle to an External Cache (E-Cache) 62. The ECU 60 provides overlap processing during load and store misses. For instance, stores that hit the E-Cache 62 can proceed while a load miss is being processed. The ECU 60 can process reads and writes and also handle snoops. Block loads and block stores, which load/store a 64-byte line of data from memory to the floating-point register file, are also processed by the ECU 60 to provide high transfer bandwidth without polluting the E-Cache 62.

A Memory Interface Unit (MIU) 64 handles all transactions to the system controller, for example, external cache misses, interrupts, snoops, writebacks, and so on.

Figure 4:
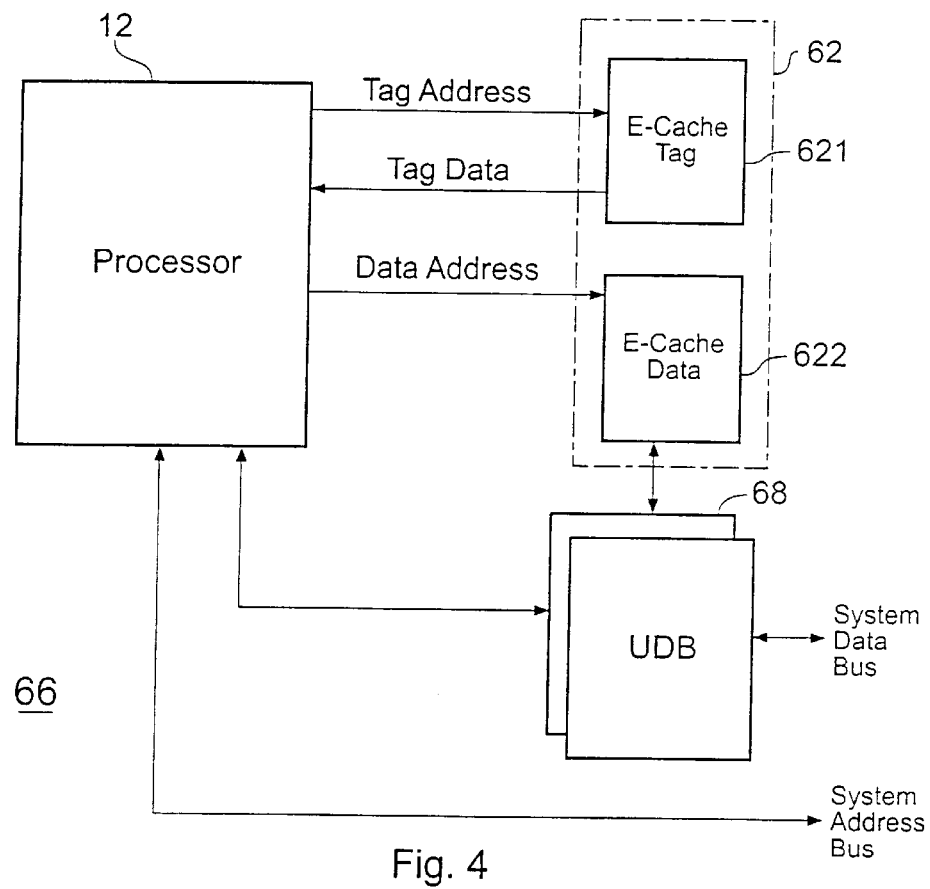
FIG. 4 is a schematic overview of a subsystem including the processor of FIG. 3.

FIG. 4 is a schematic overview of the UltraSPARC™ processor subsystem 66, which comprises the UltraSPARC™ processor 12, synchronous SRAM components for E-Cache tags and data 621 and 622, and two UltraSPARC™ data buffer (UDB) 68 chips. Typically, the processor 12 will be integrated in a single integrated circuit. The UDBs 68 isolate the E-Cache 62 from the system, provide data buffers for incoming and outgoing system transactions, and provide error correction code (ECC) generation and checking.

Figure 5:
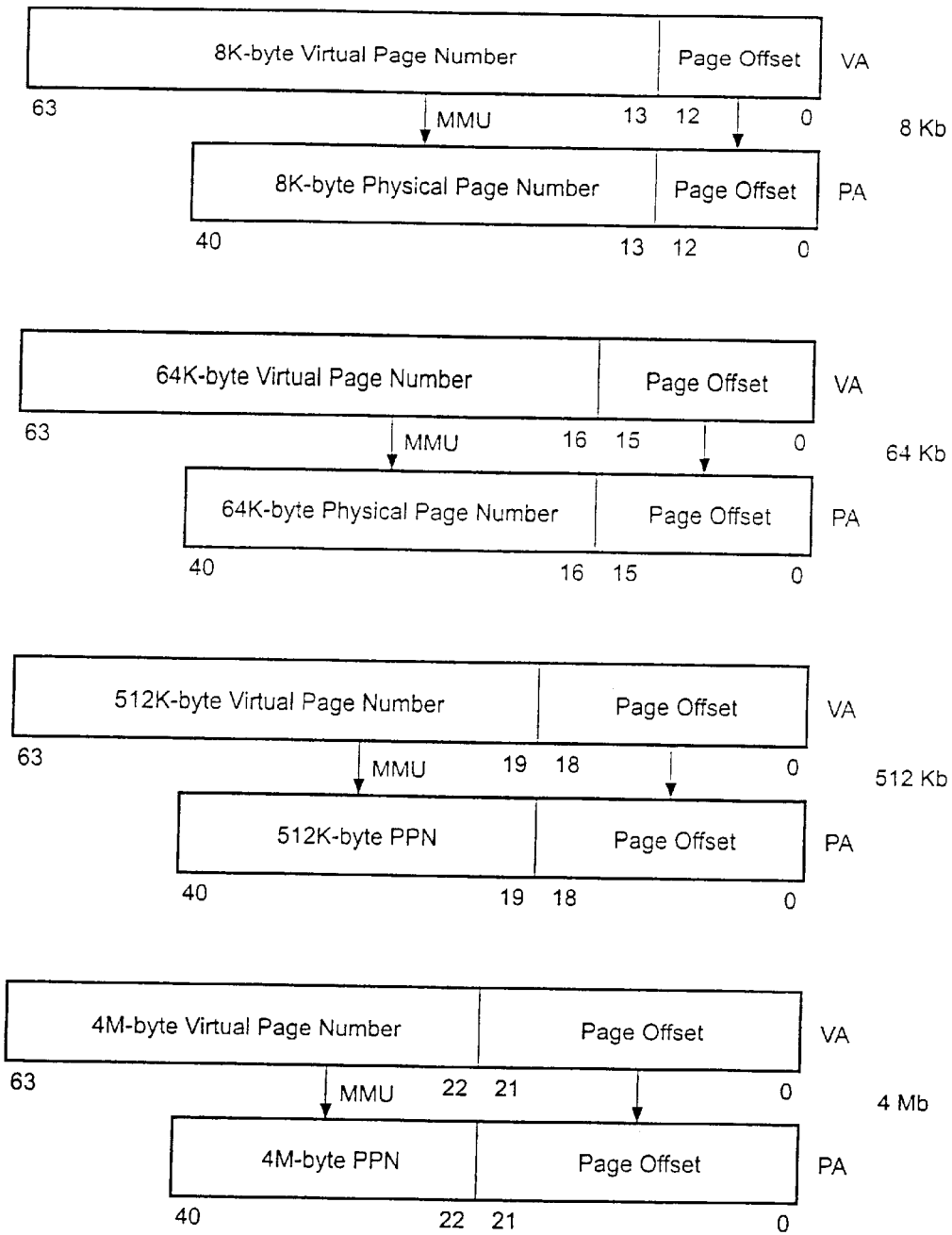
FIG. 5 illustrates virtual to physical address translation for the processor of FIG. 3.

There now follows a description of the Memory Management Unit (MMU) 28 as it is seen by operating system software. In this example, a 44-bit virtual address space is supported with 41 bits of physical address. During each processor cycle the MMU 28 provides one instruction and one data virtual-to-physical address translation. In each translation, the virtual page number is replaced by a physical page number, which is concatenated with the page offset to form the full physical address, as illustrated in FIG. 5 for each of four page sizes, namely 8 Kb, 64 Kb, 512 Kb, and 4 Mb. It should be noted that this Figure shows a full 64-bit virtual address, even though only 44 bits of Virtual Address (VA) are supported, as mentioned above.

Figure 6:
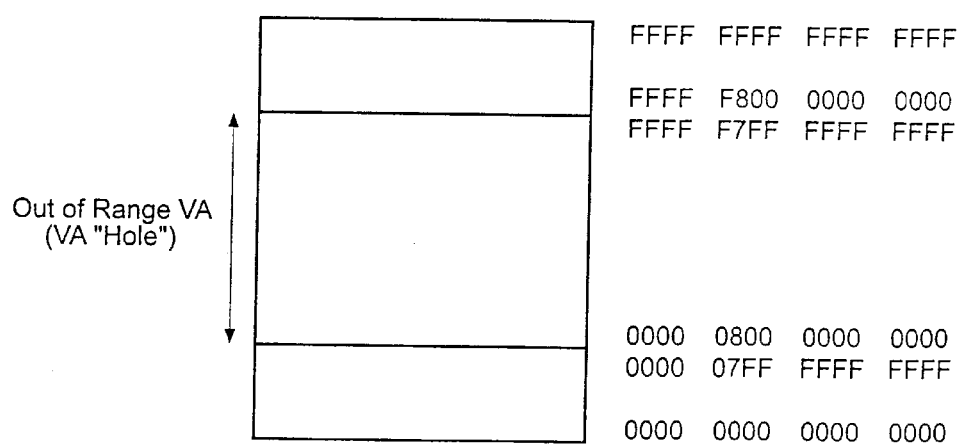
FIG. 6 illustrates an example of the relationship between virtual and physical address space for the processor of FIG. 3.

44-bit virtual address space is implemented in two equal halves at the extreme lower and upper portions of the full 64-bit virtual address space. Virtual addresses between 0000 0800 0000 000016 and FFFF F7FF FFFF FFFF$_{16}$, inclusive, are termed "out of range" and are illegal for the UltraSPARC™ virtual address space. In other words, virtual address bits VA<63:44> must be either all zeros or all ones. FIG. 6 illustrates the UltraSPARC™ virtual address space.

Figure 7:
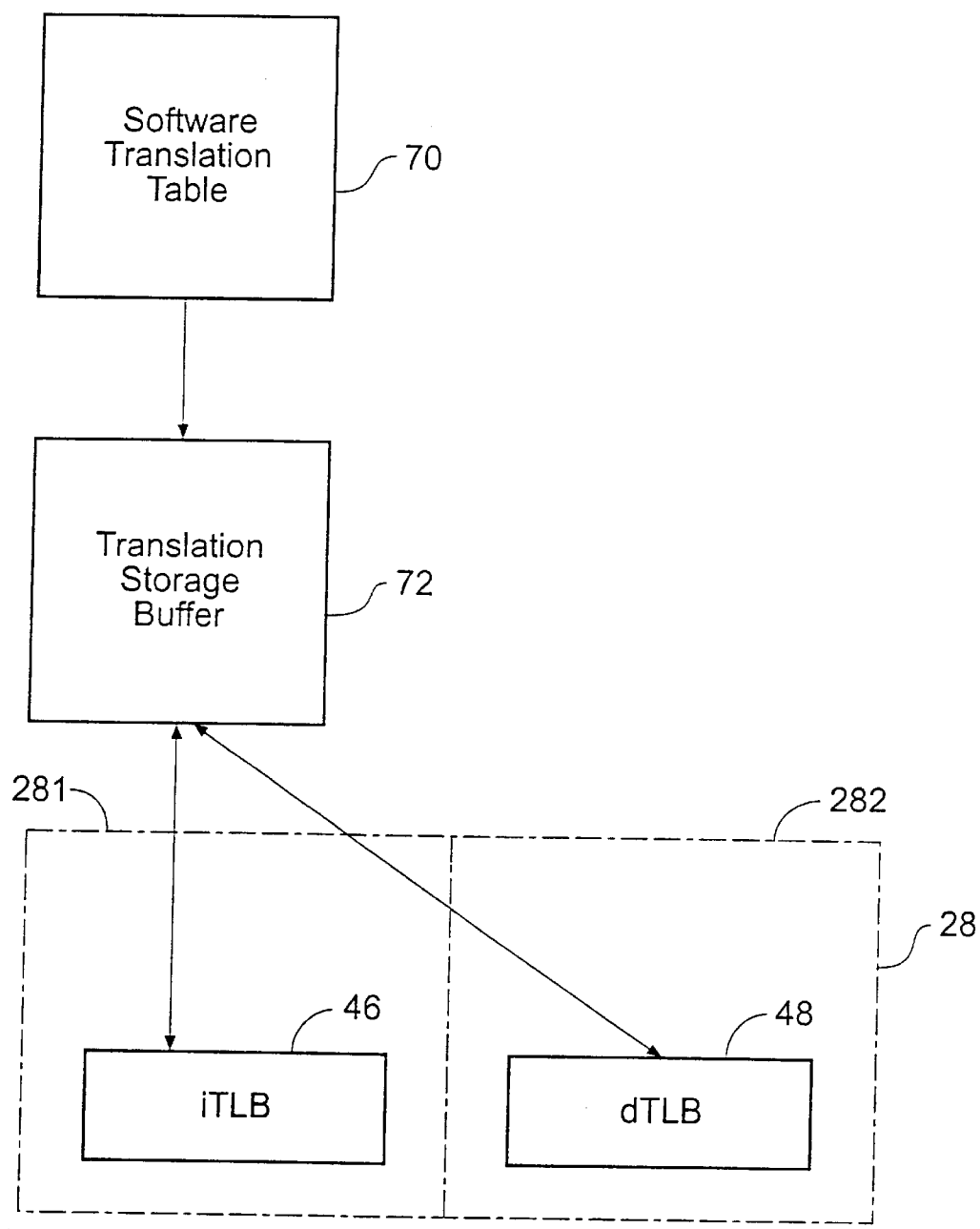
FIG. 7 is a schematic block diagram illustrating a software view of an example of the memory management unit of the processor of FIG. 3.

FIG. 7 is a block diagram illustrating the software view of the MMU 28. The operating system maintains translation information in a data structure called the Software Translation Table (STT) 70. The MMU 28 is effectively divided into an instruction MMU (I-MMU) 281 and a data MMU (D-MMU) 282. The I-MMU 281 includes the hardware instructions Translation Lookaside Buffer (iTLB) 46 and the D-MMU 282 includes the hardware instructions Translation Lookaside Buffer (dTLB) 48. These TLBs 46 and 48 act as independent caches of the Software Translation Table 70, providing one-cycle translation for the more frequently accessed virtual pages.

The STT 70, which is kept in memory, is typically large and complex compared to the relatively small hardware TLBs 46 and 48. A Translation Storage Buffer (TSB) 72, which acts like a direct-mapped cache, provides an interface between the STT 70 and the TLBs 46 and 48. The TSB 72 can be shared by all processes running on a processor, or it can be process specific.

When performing an address translation, a "TLB hit" occurs when a desired translation is present in the MMU's on-chip TLBs 46/48. A "TLB miss" occurs when a desired translation is not present in the MMU's on-chip TLBs 46/48. On a TLB miss the MMU 28 immediately traps to software for TLB miss processing. A software TLB miss handler has the option of filling the TLB by any means available, but it is likely to take advantage of TLB miss hardware support features provided by the MMU control logic 50, since the TLB miss handler is time critical code.

There now follows more information on the UltraSPARC™ Memory Management Unit (MMU) 28.

Figure 8:
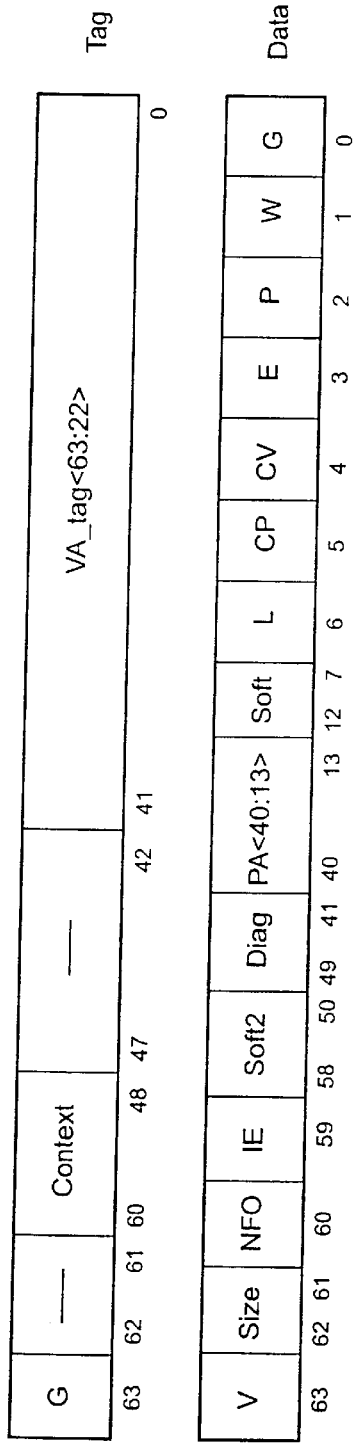
FIG. 8 illustrates a translation table entry for the memory management unit referred to with reference to FIG. 7.

An example of an UltraSPARC™ Translation Table Entry (TTE) of the TSB 72 is shown in FIG. 8. This provides a translation entry that holds information for a single page mapping. The TTE is broken into two 64-bit words, representing the tag and data of the translation. Just as in a hardware cache, the tag is used to determine whether there is a hit in the TSB 72. If there is a hit, the data is fetched by software. The functions of fields of the tag and data words are described below.

Tag Word

G—This is a Global bit. If the Global bit is set, the Context field of the TTE is ignored during hit detection. This allows any page to be shared among all (user or supervisor) contexts running in the same processor. The Global bit is duplicated in the TTE tag and data to optimize the software miss handler.

Context—This is a 13-bit context identifier associated with the TTE.

VA-tag<63:22>—The Virtual Address tag is the virtual page number.

Data Word

V—This is a Valid bit. If the Valid bit is set, the remaining fields of the TTE are meaningful.

Size—This is the page size for this entry.

NFO—This is No-Fault-Only bit. If this bit is set, selected specific loads are translated, but all other accesses will trap with a data_access_exception trap. IE—This is an Invert Endianness bit. If this bit is set, accesses to the associated page are processed with inverse endianness from what is specified by the instruction (big-for-little and little-for-big).

Soft<5:0>, Soft2<8:0>—These are software-defined fields provided for use by the operating system. The Soft and Soft2 fields may be written with any value.

Diag—This is a field used by diagnostics to access the redundant information held in the TLB structure. Diag<0>= Used bit, Diag<3:1>=RAM size bits, Diag<6:4>=CAM size bits.

PA<40:13>—This is the physical page number. Page offset bits for larger page sizes in the TTE (PA<15:13>, PA<18:13>, and PA<21:13> for 64 Kb, 512 Kb, and 4 Mb pages, respectively) are stored in the TLB and returned for a Data Access read, but are ignored during normal translation.

L—This is a Lock bit. If this bit is set, the TTE entry will be "locked down" when it is loaded into the TLB; that is, if this entry is valid, it will not be replaced by the automatic replacement algorithm invoked by an ASI store to the Data-In register.

CP, CV—These form cacheable-in-physically-indexed-cache and cacheable-in-virtually-indexed cache bits to determine the placement of data in UltraSPARC™ caches. The MMU does not operate on the cacheable bits, but merely passes them through to the cache subsystem.

E—This is a Side-effect bit. If this bit is set, speculative loads and FLUSHes will trap for addresses within the page, noncacheable memory accesses other than block loads and stores are strongly ordered against other E-bit accesses, and noncacheable stores are not merged.

P—This is a Privileged bit. If this bit is set, only the supervisor can access the page mapped by the TTE. If the P bit is set and an access to the page is attempted when PSTATE.PRIV=O, the MMU will signal an instruction_access_exception or data_access_exception trap (FT=$1_{16}$).

W—This is a Writable bit. If the W bit is set, the page mapped by this TTE has write permission granted. Otherwise, write permission is not granted and the MMU will cause a data_access_protection trap if a write is attempted. The W-bit in the I-MMU is read as zero and ignored when written.

G—This is identical to the Global bit in the TTE tag word. The Global bit in the TTE tag word is used for the TSB hit comparison, while the Global bit in the TTE data word facilitates the loading of a TLB entry.

The above description of the UltraSPARC™ processor represents an example of a prior art processor. In the following, the application of an embodiment of the invention in the context of such a processor is to be described, it being understood that the invention can equally be applied to processors of alternative designs and configurations.

The present invention relates to the control of resource access in a processor such as described above, or in such alternative designs and configurations. In particular, the invention relates to providing a solution to the problem found in conventional systems, whereby multiple traps are taken, and multiple exception processing is performed, each time access is effected to a faulty resource.

Where a faulty resource access, as effected for example by a mis-configured or badly written program (or portion of an operating system), is identified by a processor, this is conventionally dealt with by taking a trap or an interrupt. Likewise where accesses are made to faulty or missing peripheral devices, it is conventional for this to be dealt with by a hardware trap or interrupts. These exceptions take time to handle. If exception handling is required for a single faulty access, then this can normally be accommodated without a significant impact on system performance. However, where such faulty accesses are performed repeatedly, this can lead to a significant reduction in performance. Accordingly, the invention seeks to provide a mechanism whereby accesses may be dropped where repeated access to a faulty resource is attempted, whereby the requirement for taking repeated traps and handling repeated exceptions with the consequential logging of exception data in response to repeated faulty accesses to the same resource address can be avoided.

In the following, an embodiment of the invention will be described in which modifications are made to a conventional processor as described above.

Figure 9:
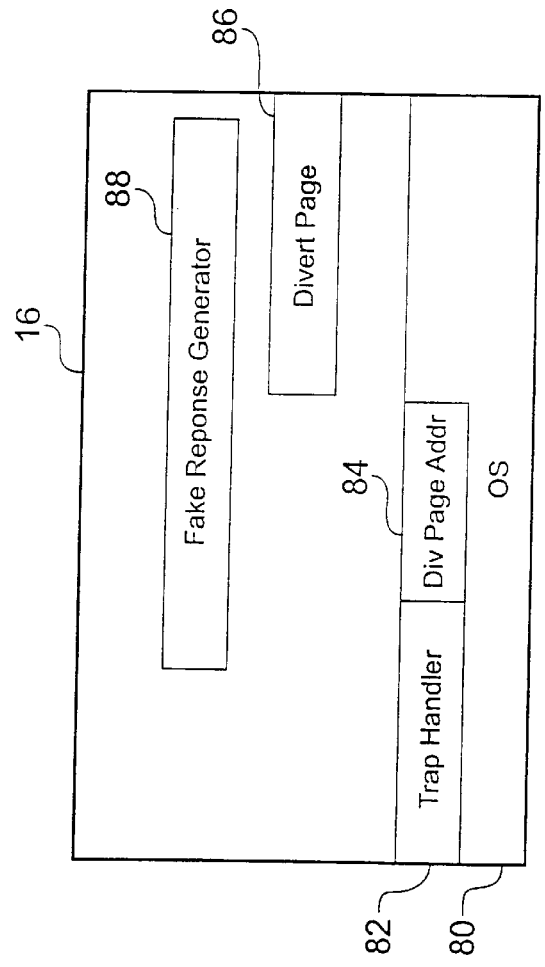
FIG. 9 is a schematic block diagram of software components of a first exemplary implementation of the invention.

FIG. 9 is a schematic representation of various software elements in the memory 16 of the processor shown in FIG. 1. As represented in FIG. 9, an operating system 80 is provided with one or more trap handlers 82. In an embodiment of the invention, the trap handlers are modified with respect to a conventional trap handler to reference a divert page address 84. The divert page address 84 can be held in a register of a predefined storage location. The trap handler 82 supplies the divert page address to the address translation mechanism, in the present instance the memory management unit 28 of the processor shown in FIG. 1.

The divert page address 84 is used to modify the address translation mapping in the memory management unit for the resource which was faulty and which led to the trap handler 82 having to process an exception. The changing of the mapping is performed by the control logic of the memory management unit 28 in response to a command from the trap handler, which command identifies the resource address which lead to the fault, and also the divert page address. Storing the divert page address in the TTE corresponding to the resource concerned changes the mapping in the MMU to point to a reliable resource, for example a page 86 of memory. The page 86 of memory can simply be used as a sink into which faulty accesses are directed. In such a case, the automatic acknowledgement generated by the memory subsystem will provide a response to the access. Alternatively, the divert page address 84 could indicate a hardware faked response generator 88 that responds to any address within a given range, for example a range of at least one page, to provide a faked response.

FIG. 10 gives an overview of the operation of an embodiment of the invention. In step S1, there is shown a first attempt to access a particular resource R. In step S2, the address of that resource access is translated using the standard address translation in the address translation mechanism formed by the MMU 28. However, as the resource is faulty, in step S3 the resource access fails.

This leads to a trap being taken and the trap handler being invoked in step S4. The trap handler is then operable in step S5 to supply or otherwise identify the divert address, which can be held in a register, or in a specific memory location, to the address translation mechanism. The address translation mechanism is then operable in step S6 to modify the TTE for the resource concerned. The modification of the TTE is effected by the control logic 50 of the memory management unit 28. The result of the modification to the TTE is that any subsequent attempts to address the resource will pick up not the address of the resource from the TTE, but rather the address of the divert location or resource (eg, the divert page 86).

The trap handler is also operable in step S7 to effect the processing of the exception caused by the faulty resource access. The exception processing represented by step S7 can be started in parallel with step S5, although this will take a considerably longer time than merely providing the divert address to the memory management unit 28.

FIG. 10 also represents a subsequent resource access attempt at S8. As the divert address has already been recorded in the TTE for the received address, the divert address will be used in step S9 for the address translation whereby access is effected in step S10 to the divert resource (eg, the divert page 86). This has the result that a valid resource access will be made (albeit to a resource other than the intended resource), no trap needs to be taken, and no further exception processing needs to be effected.

As mentioned above, optionally, a fake response generator 88 could be activated as the divert resource in order to generate a fake response for simulating a true access to the resource to which the original access was directed.

As an alternative, the fake response generator 88 could be implemented in hardware in the memory management unit. The fake response generator could include storage containing fake responses to be returned as the faked response.

In the above-described embodiment of the invention, the resource access control is provided using an address translation mechanism in a processor, for example in the processor's memory management unit. However, the benefits of the invention can also be achieved using address translation mechanisms at other parts of the computer system. One such example is in a bridge such as the I/O bridge 18 between the buses 14 and 20. In such a case, the trap handler would be operable to instruct the address translation mechanism in the bridge to change the appropriate address mapping.

The computer program implementing the trap handler can be provided as a computer program on a carrier medium. The carrier medium could be storage medium (such as an optical, a magneto-optical, a magnetic or a solid state storage medium configured as a disk, tape or solid state device, etc), or a transmission medium (such as a telephonic, wireless, copper, optical or other wired medium, etc), or a mixture thereof, as appropriate.

Accordingly, there has been described an apparatus and a method to provide efficient resource access control in a computer system. A trap handler is provided for handling a trap in the event of a faulty resource access being detected is arranged to define a diversion for subsequent access attempts to the same resource. An address translation mechanism is responsive to indication of a diversion for a resource access to modify an address mapping, whereby subsequent attempts to access the resource are diverted in accordance with the diversion. The trap handler can be arranged in a conventional manner to process an exception of the first faulty access to the resource. However, by defining the diversion, which can be used to map further attempts to access the same resource, unnecessary exception processing can be avoided.

Although particular embodiments of the invention have been described, it will be appreciated that many modifications/additions and/or substitutions may be made within the scope of the invention.

For example, the divert address need not be supplied by the trap handler. The trap handler can simply instigate the diversion by signaling the address translation mechanism to effect the diversion. The address translation mechanism can then be arranged to replace the usual address translation with an alternative one from some predefined register or memory address.

Rather than actually changing the address stored in the TTE, one or more bits in the TTE can be designated as a divert flag, and this divert flag can be set when a divert address is to be used rather than the normal translation address for the TTE. For example an undefined bit (say bit 61) in the tag field of the TTE illustrated in FIG. 8 could be designated as a divert flag bit. The divert address can be held, for example, in a predefined register or memory location that forms part of the address translation mechanism. In such an embodiment, steps S5, S6 and S9 of the method described with reference to FIG. 10 are modified. In step S5 the trap handler is operable to instruct the address translation mechanism to set the divert flag bit. In step S6, the control logic of the address translation mechanism is operable to modify the TTE for the resource concerned by setting the divert flag bit. In step S9 the address translation mechanism is arranged to react to the flag bit of the TTE entry for the received address to use the divert address from the register or specific memory location for the resource access, rather than the address translation identified in the TTE.

As a further alternative based on the use of a divert flag, rather than using a specific divert address from a divert register or memory location in step S9, the address translation mechanism can be arranged to modify the normal translated address identified in the TTE. Such a remapped address also forms a divert address. For example one bit might be changed to divert the translated address into an otherwise unused address range. A fake response generator can be configured to respond to an address in that otherwise unused address range, whereby the fake response generator alone will respond to the diverted address.

These alternative embodiments enable a diversion to be defined that can be used to map further attempts to access a faulty resource, thereby avoiding unnecessary exception processing.

Although the described embodiments employ translation tables, it will be appreciated that the translation entries need not be stored in tabular form, but could be held in any other suitable form, for example in a linked list. Thus for example, where reference is made to a table or sub-table above, this could be replaced by a reference to a list, or sub-list.

Moreover, the invention is not limited to any particular technology for looking up translation entries. For example, where tables are used, these could be fully or set associative as appropriate.

An embodiment of processor according to the invention could be used in both single processor and multiple processor systems.

What is claimed is:

1. A resource access control mechanism for a computer system including at least one central processing unit, the resource access control mechanism comprising an address translation mechanism operable to map a received address to a resource and a trap handler for handling a trap in the event of a faulty resource access being detected, the trap handler being operable to instigate a diversion for subsequent access attempts to the resource and the address translation mechanism being responsive to instigation of a diversion by the trap handler to effect the diversion for subsequent attempts to access the resource.

2. The resource access control mechanism of claim 1, wherein the trap handler is further operable to process an exception.

3. The resource access control mechanism of claim 1, wherein the address translation mechanism includes a translation look-aside buffer.

4. The resource access control mechanism of claim 1, wherein the address translation mechanism forms part of a memory management unit.

5. The resource access control mechanism of claim 1, wherein the trap handler is operable to identify an alternative resource address to the address translation mechanism for replacing a resource address held in an address translation entry for the resource.

6. The resource access control mechanism of claim 1, wherein the trap handler is operable to instigate the diversion by signaling the address translation mechanism.

7. The resource access control mechanism of claim 6, wherein the address translation mechanism is responsive to instigation of a diversion by the trap handler to replace a resource address held in an address translation entry for the resource with an address for an alternative resource.

8. The resource access control mechanism of claim 6, wherein the address translation mechanism is responsive to instigation of a diversion by the trap handler to set a divert flag in a translation entry of the address translation and is further operable to respond to a received address relating to an address translation entry having a divert flag set to use an alternative address to that held in the address translation entry.

9. The resource access control mechanism of claim 6, wherein the address translation mechanism is responsive to instigation of a diversion by the trap handler to set a divert flag in a translation entry of the address translation and is further operable to respond to a received address relating to an address translation entry having a divert flag set to modify an address held in the address translation entry.

10. The resource access control mechanism of claim 1, wherein the resource is at least one memory location.

11. The resource access control mechanism of claim 1, wherein the resource is a peripheral device.

12. The resource access control mechanism of claim 1, wherein the resource is a subsystem.

13. The resource access control mechanism of claim 7, wherein the alternative resource is a faked response generator.

14. The resource access control mechanism of claim 7, wherein the alternative resource is a predefined memory portion.

15. A computer system comprising at least one processor that includes at least one central processing unit, memory, at least one peripheral device and a resource access control mechanism, wherein the resource access control mechanism comprises
  an address translation mechanism operable to map a received address to a resource and
  a trap handler for handling a trap in the event of a faulty resource access being detected, the trap handler being operable to instigate a diversion for subsequent access attempts to the resource and
  the address translation mechanism being responsive to instigation of a diversion by the trap handler to effect the diversion for subsequent attempts to access the resource.

16. The computer system of claim 15, operable to identify an initial faulty access to a resource.

17. A method of managing processor access to resources in a computer system, the method comprising:
  a trap handler handling a trap in the event of an initial faulty access attempt to a resource being detected;
  said trap handler instigating a diversion in an address translation mechanism for subsequent access attempts to the same resource;
  said address translation mechanism diverting a subsequent attempt to access the resource.

18. The method of claim 17, further comprising processing an exception.

19. The method of claim 17, wherein the defining of a diversion includes replacing a resource address held in an address translation entry for the resource with an alternative resource address.

20. The method of claim 17, wherein the defining of a diversion includes setting a divert flag in an address translation entry for the resource and the diverting of a subsequent attempt to access the resource includes using an different address to that held in the address translation entry when the divert flag is set.

21. The method of claim 17, wherein the defining of a diversion includes setting a divert flag in an address translation entry for the resource and the diverting of a subsequent attempt to access the resource includes modifying an address held in the address translation entry.

22. The method of claim 17, wherein the diversion is to a predefined memory portion.

23. The method of claim 17, wherein the diversion results in the generation of a faked response to the resource access.

24. The method of claim 17, wherein the resource is at least one memory location.

25. The method of claim 17, wherein the resource is a peripheral device.

26. The method of claim 17, wherein the resource is a subsystem.

27. A computer program on a carrier medium, the computer program forming a trap handler for a computer system and comprising computer code operable:
  to respond to a faulty resource access by processing an exception; and
  to instigate a diversion in an address translation mechanism for subsequent access attempts to the resource.

28. The computer program of claim 27, wherein the carrier medium is a storage medium.

* * * * *

UNITED STATES PATENT AND TRADEMARK OFFICE
CERTIFICATE OF CORRECTION

PATENT NO. : 6,795,937 B2  Page 1 of 1
APPLICATION NO. : 09/783119
DATED : September 21, 2004
INVENTOR(S) : Jeremy Graham Harris and Paul Durrant It is certified that error appears in the above-identified patent and that said Letters Patent is hereby corrected as shown below:

On the title page item (54), and col. 1, line 1, delete the title, "MULTIPLE TRAPS AFTER FAULTY ACCESS TO A RESOURCE" and replace with --MECHANISM FOR AVOIDING MULTIPLE TRAPS AFTER FAULTY ACCESS TO A RESOURCE--

Column 12,

Line 43, please insert --29.    The computer program of claim 27, wherein the carrier medium is a transmissions medium.--

Signed and Sealed this

Twenty-sixth Day of February, 2008

JON W. DUDAS
*Director of the United States Patent and Trademark Office*